INVENTOR.
GUY D'HUART

United States Patent Office 3,442,748
Patented May 6, 1969

3,442,748
METHOD FOR SURFACE WORKING GLASS
Guy D'Huart, Versailles, France, assignor to Compagnie de Saint-Gobain, Neuilly-sur-Seine, France
Filed July 13, 1965, Ser. No. 471,643
Claims priority, application France, July 20, 1964, 982,267
Int. Cl. B32b *17/06, 5/16*
U.S. Cl. 161—1                              10 Claims

ABSTRACT OF THE DISCLOSURE

A fine powder is made to adhere to the face of a hot, newly formed glass sheet and the sheet is calendered. The sheet is useful to give diffused light and is more readily ground and polished than ordinary sheet. The powder may be applied by drawing the sheet through it, by blowing it upon the sheet in a flame, and blowing it upon the sheet in a stream of air accompanied by an electrostatic discharge.

---

The present invention relates to a method and apparatus for surface working sheet glass as it is formed continuously from a mass of molten glass as a flat ribbon by a usual process such as casting, rolling, drawing, extrusion.

When sheet glass is formed as a continuous flat ribbon from a mass of molten glass, it is usual for said glass to be rolled initially between rolls to obtain a flat ribbon. This initial rolling has heretofore ordinarily produced surface defects, such as a "hammered" surface, on the sheet. This "hammered" surface is the result of the cool surfaces of the rolls cooling the surface of the glass sheet rapidly with respect to the interior which produces a type of wrinkled surface referred to as "hammered." It has been proposed to overcome the "hammered" effect produced by previously used techniques of rolling by heating the rolls, but when this is done the glass tends to stick to the metal of the rolls.

It is an object of the present invention to provide a method and apparatus for working the surfaces of sheet glass in its initially formed state to planish it to a uniform thickness.

Another object is to provide a method and apparatus by which the surface working of sheet glass produces glass sheet suitable for uses where translucent glass is desired or which may be ground and polished to transparency with less grinding and polishing than normally required with the usual methods.

In accordance with the invention, a continuous newly formed ribbon of glass formed from a mass of molten glass is brought to a malleable condition and passed through a hot planishing device, such as a pair of calender rolls, to planish the ribbon to a uniform thickness. efore entering the planishing device, however, the surfaces of the ribbon at opposite sides thereof are covered with a powder of a material the particles of which do not fuse together and which adheres to the glass but not to the working surfaces of the planishing device at the temperatures at which the glass ribbon is worked. It is possible, according to the invention, to use metallic calender rolls, the glass not adhering to the hot surfaces due to the presence of the interposed particles.

The temperature in the glass ribbon when entering in the planishing device may be generally such that the viscosity of the glass is comprised between $10^7$ and $10^{10}$ poises. The temperature of the surface of the planishing device when entering into contact with the glass ribbon may be in substantially the same range as the temperature in the glass ribbon.

After the glass sheet has passed through the planishing device it is cooled to ambient or room temperature by usual techniques known in the art. For example, as the glass is cooling during the usual annealing extra precautions are taken when the viscosity of the glass is between $10^{13.4}$ and $10^{14.6}$ poises. It is also possible to subject the glass sheet to a brief and intense application of heat as described in U.S.P. No. 3,107,196, Oct. 15, 1963.

Suitable materials for the powder with which the glass sheet is covered for the surface planishing operation are carbides, carbonates, graphite, oxides and silicates. Said materials may be used separately or in various mixtures. Specific examples of useful materials for the powder are alumina, calcium carbonate, cerium oxide, graphite, kaolin, silica, silicon carbide and talc.

It is desirable for the powder to be in finely divided particles and in practice good results are obtained with powder comprising particles less than 100 microns in size. Excellent results have been achieved in practice using powders the particles of which are less than 10 microns in size in particular with white silica powders. In such a white silica powder which produced excellent results, about 70% of the particles, by weight, were less than 6 microns in size; about 40% of the particles were less than 4 microns, and about 15% of the particles were less than 2 microns.

During the calendering operation, most of the powder particles are pressed into the surface layer of the glass. The glass sheet has a general defrosted or translucent aspect. When such sheets are to be manufactured, the glass sheets are simply brushed and if necessary washed to eliminate the powder particles not adhering to the glass. Translucent colored glass sheets can be obtained by using powder of appropriate material and color.

The above and further objects and novel features of the method of the present invention and apparatus for carrying out the method in accordance with the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views.

Figure 1:
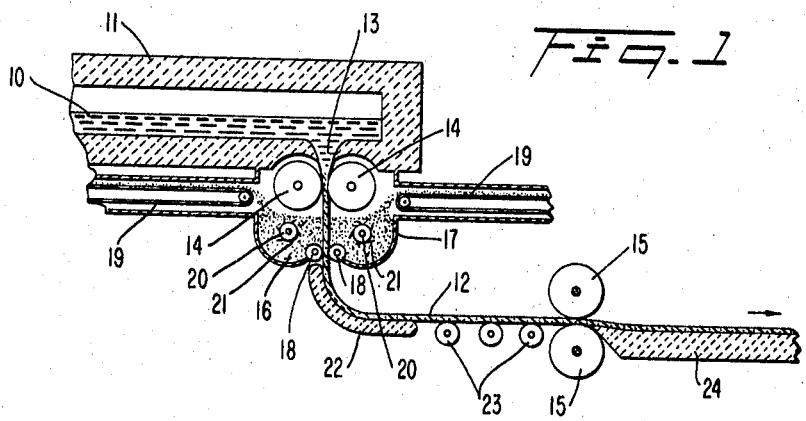
FIGURE 1 is a longitudinal section through apparatus for carrying out one form of the method of surface working sheet glass in accordance with the present invention.

Looking first at FIGURE 1, a mass of molten glass 10 in an oven 11 is formed into a ribbon or sheet 12 of glass by being taken through a slit 13 in the bottom wall of the oven and out between a pair of spaced apart cooling rolls 14. The sheet 12 of glass is planished to a uniform thickness by being passed through a calendering device such as a pair of spaced apart calender rolls 15.

In accordance with the method of the invention, the sheet 12 is covered with powder 16 before it passes through the calender rolls 15. In the embodiment shown in FIGURE 1, the powder 16 is applied to the sheet 12 by passing the sheet 12 through a mass of the powder 16 contained in a chamber 17 adjacent and below the cooling rolls 14. As shown, the sheet 12 passes between the cooling rolls 14 down into the chamber 17, through the mass of powder 16 in the chamber and then out a narrow passage through the bottom of the chamber provided by a pair of spaced apart rollers 18 mounted in a suitable opening in the bottom wall of the chamber 17. Powder 16 is continuously supplied to the chamber 17 from a suitable source by a pair of conveyor belts 19 in communication with the chamber 17 at opposite sides thereof respectively. As previously mentioned, the powder 16 is of a material the particles of which do not fuse together or stick to the calender rolls 15 at the temperatures at which the glass of the sheet 12 is worked in a malleable condition but which adheres to the glass sheet at these temperatures. The powder 16 in the chamber 17 adheres to the surfaces of the sheet passing therethrough, and to assure good contact between the powder and the sheet the powder in the chamber is agitated by a pair of wheels 20 which have vanes 21 projecting from their peripheral surfaces. The wheels 20 are rotatable and are at opposite sides of the sheet 12.

When the sheet emerges from the rollers 18, which form the outlet passage from the chamber 17, it is directed by a curved deflector guide 22 of refractory material onto a train of support rollers 23 which carry the sheet into the bite of the spaced apart calender rolls 15. With the apparatus shown in FIGURE 1, the sheet 12 is hot and in malleable condition as it passes between the adjustably spaced calender rolls 15 which are spaced to exert suitable pressure on the sheet 12 for rolling it to uniform thickness. The calender rolls 15 are suitably made of refractory steel, such as nickel-chrome steel, in order to withstand temperatures up to about 800° C. without damage. In accordance with the invention, these rolls may be heated by any suitable means such as gas burners or electric resistance coils, not shown, in order to keep their peripheral surfaces at temperatures convenient for the working of the glass sheet. As previously said the temperature of the surface of the rolls which come in contact with the glass sheet may be substantially in the same range as the temperature of the glass sheet.

After the sheet 12 passes between the calender rolls 15 it is received on a support 24 of refractory material. The support 24 is suitably made of compressed sillimanite which has an upper supporting surface which has been smoothed and dressed by diamond grinding for example. After leaving the refractory support 24 the sheet 12 is cooled to ambient or room temperature by appropriate means known in the art.

Figure 2:
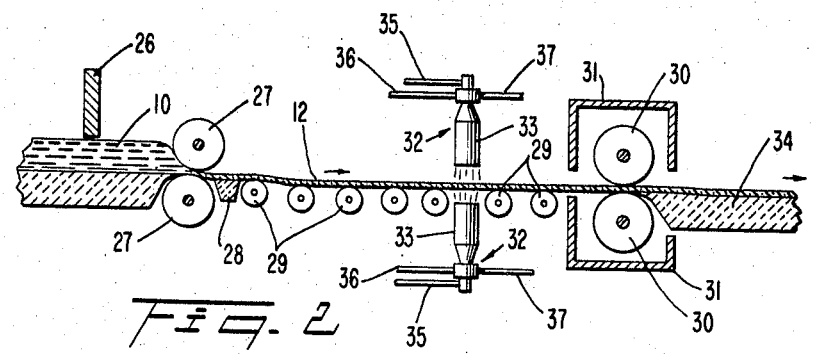
FIGURE 2 is a longitudinal section through apparatus for carrying out a variation of the method in accordance with the present invention.

A variation of the method in accordance with the present invention is carried out by the apparatus shown in FIGURE 2. In this apparatus the glass sheet 12 is formed by being passed as a continuous ribbon through spaced cooling rolls 27 from a mass of molten glass 10 in an oven indicated at 26. From the cooling rolls the sheet passes over a refractory support block 28 from which it is carried by a train of support rollers 29 into the bite of a pair of adjustable, spaced apart calender rolls 30, which, like the calender rolls 15 described with reference to FIGURE 1, may be heated by suitable electric or other means to a convenient temperature. In this instance, the calender rolls 30 are shown partially enclosed in thermally insulated shields 31 to assist in maintaining the rolls 30 at the desired temperature.

In the embodiment illustrated in FIGURE 2 the powder 16, which is deposited on the surfaces of the sheet 12 before it passes through the calender rolls 30, is applied by a pair of burners 32 arranged at opposite sides of the portion of the sheet 12 which is between the cooling rolls 27 and the calender rolls 30. Each burner 32 includes a nozzle 33 directed toward the adjacent surface of the sheet and is in position for flames from the nozzle to heat the sheet 12 across its width as the sheet moves between the burners. Each of the burners 32 is supplied with combustible gas and air, from sources not shown, through tubes 35 and 36 respectively. The gas and air are combined into a combustible mixture and pass out the open ends of the nozzles 33 where the gas is ignited and burns adjacent the sheet 12. A tube 37 connected into each burner 32 conducts a suspension of powder 16 in a stream of air from a supply (not shown) to the burners. The powder is thus carried in suspension by the combustible gas and air mixture and, as the gas burns at the end of each nozzle 33, an even covering of the powder is deposited on the adjacent surface of the sheet. In addition, the burning gas heats the sheet to convenient temperature. The distance of the burner nozzles 33 from the sheet may be adjusted as a means of adjusting the temperature applied to the sheet and more than one pair of burners 32 may be provided if necessary, to assure that the entire width of the sheet is heated and covered with powder.

After the powder covered sheet 12 has passed through the calender rolls 30 it is received on a refractory support 34 similar to the refractory support 24 of FIGURE 1. Thereafter the sheet is cooled to ambient or room temperature by means known in the art.

Figure 3:
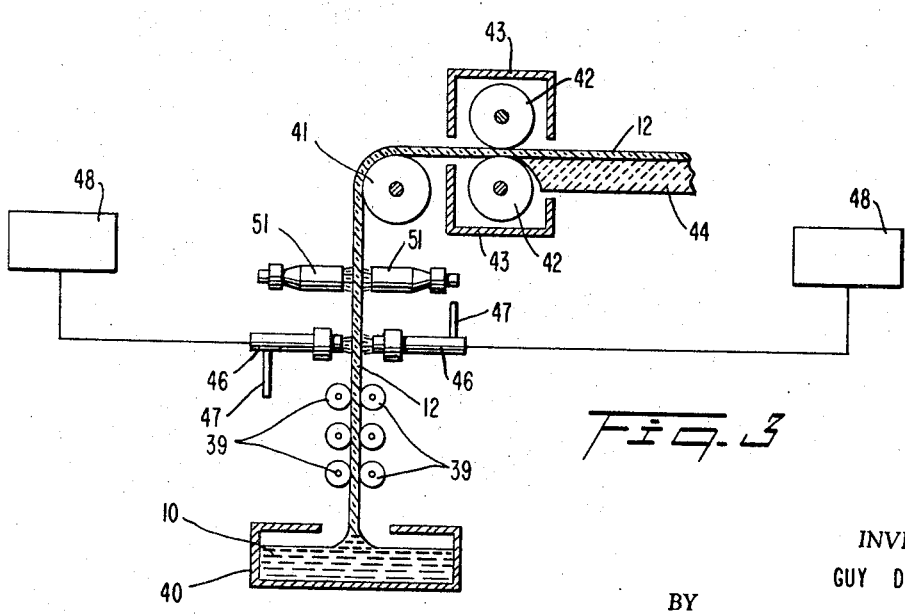
FIGURE 3 is a longitudinal section through apparatus for carrying out another variation of the method in accordance with the invention.

FIGURE 3 shows apparatus for carrying out another variation of the method of this invention. In the apparatus of this embodiment the sheet 12 is formed by being drawn up as a continuous ribbon between pairs of rollers 39 from a mass of molten glass 10 in a furnace 40. For the calendering operation the sheet is drawn over a guide roller 41 and between adjustably spaced apart calender rolls 42 which are partially enclosed by insulating shields 43 and heated as described with reference to the calender rolls 30 of FIGURE 2. After passing between the calender rolls 42 the sheet 12 is received on a smooth surfaced refractory support 44 which is similar to the supports 24 and 34 described with reference to FIGURES 1 and 2 respectively.

In the embodiment of FIGURE 3 the sheet 12 is covered with powder 16 before calendering by means of air nozzles 46 arranged at opposite sides of the portion of the sheet 12 moving from the rollers 39 to the guide roller 41. Powder 16 is suspended in streams of air conducted to the air nozzles 46 from a supply, not shown, by tubes 47 connected respectively to the nozzles 46 which are directed toward the adjacent surface of the sheet 12 so that the streams of air from the nozzles impinge on the surfaces of the sheet at opposite sides thereof and deposit powder on the surfaces. In addition, to facilitate the adhesion of the powder to the sheet 12 in an even coating, an intense electric field is created between the sheet and the nozzles at the point at which the streams of air and powder impinge upon the sheet. This is accomplished by applying a difference in electric potential, suitably between 10,000 and 100,000 volts, between the nozzles 46 and the sheet 12. The potential difference is provided by connecting the nozzles to suitable electrostatic generators 48. The nozzles 46 are moved to and fro transversely to the sheet if necessary to make a uniform deposit of powder over the whole surface of the sheet.

In order to heat the sheet 12 to convenient temperature after the powder has been applied by the nozzles 46 a pair of burners 51 are arranged adjacent the surfaces at opposite sides of the sheet at a point in the path of the sheet between the nozzles 46 and the guide roller 41. A combustible mixture of gas and air is supplied to each of the burners 51 through suitable conduits from a source of supply, not shown, and the burners are adjustably positioned toward or away from the sheet moving therebetween so that the combustible mixture burning at the nozzle portion of each burner will heat the glass sheet to a temperature such that the glass is malleable as it passes between the calender rolls 42. In addition, this application of heat improves the adhesion of the powder to the sheet 12. Of course, more than one pair of burners 51 may be provided if necessary to adequately heat the sheet 12 across its entire width.

As many apparently widely different embodiments of the present invention may be made without departing from the spirit and scope thereof, it is to be understood that the invention is not limited to the specific embodiments.

What is claimed is:

1. A method of continuously forming and surface working a sheet of glass which comprises forming glass in the form of a sheet from a mass of molten glass, covering the surfaces at opposite sides of said sheet with powder, and passing the powder-covered sheet while it is in a malleable condition through a hot planishing means, in order to planish it to uniform thickness, said powder being of a material which remains substantially particulate and penetrates the surface of the glass, indents it, and remains attached thereto but not to the working surfaces of the planishing means at the temperatures and pressures at which the glass sheet is planished.

2. The method of claim 1 wherein, after passing through the planishing means, the glass sheet is cooled to room temperature and at least one side of the sheet is ground and polished.

3. The method of claim 1 wherein the temperature in the glass sheet when entering the planishing means is such the the viscosity of the glass is comprised between $10^7$ and $10^{10}$ poises.

4. The method of claim 1 in which the powder comprises at least one material from the group consisting of alumina, calcium, carbonate, cerium oxide, graphite, kaolin, silica, silicon carbide and talc.

5. The method of claim 1 wherein the surfaces of the glass sheet to be worked are covered with the powder by passing said glass sheet through a mass of said powder.

6. The method of claim 1 wherein the surfaces of the glass sheet to be worked are covered with the powder by suspending said powder in streams of combustible gas which are directed toward said surfaces and burned in contact therewith.

7. The method of claim 1 wherein the surfaces of the glass sheet to be worked are covered with the powder by drawing the sheet between streams of air, in which said powder is suspended, directed upon the opposite sides of the sheet by nozzles, and in which a difference in electric potential is established between the nozzles and the sheet.

8. The method of claim 1 in which the powder is of the type of metal carbides, carbonates, oxides, and silicates, and graphite, and is in particles less than about 100 microns in size, preferably having substantial components on the order of about 2 to 10 microns in size.

9. The method of claim 7 in which the difference in potential is on the order of 10,000 to 100,000 volts.

10. Powder-coated, planished glass sheet made by the process of claim 1.

References Cited

UNITED STATES PATENTS

| | | | |
|---|---|---|---|
| 1,039,829 | 10/1912 | Sievert | 65—26 XR |
| 1,615,840 | 2/1927 | Hitchcock | 65—169 |
| 1,680,588 | 8/1928 | Black | 65—254 XR |
| 1,680,227 | 8/1928 | Mambourg | 56—26 |
| 1,818,204 | 8/1931 | Drake | 65—254 XR |
| 1,857,213 | 5/1932 | Poundstone | 65—24 |
| 2,176,480 | 10/1939 | Waldron et al. | 65—94 XR |
| 2,252,898 | 8/1941 | Pollack | 65—60 XR |
| 2,392,770 | 1/1946 | Ryan et al. | 65—23 |
| 2,431,629 | 11/1947 | Wind et al. | 117—93.4 |
| 2,675,646 | 4/1954 | Kramer et al. | 65—60 XR |
| 2,725,320 | 11/1955 | Atkeson et al. | 65—24 XR |
| 2,795,512 | 6/1957 | Sherratt et al. | 117—17 XR |
| 2,904,449 | 9/1959 | Bradstreet | 65—60 XR |
| 3,323,889 | 6/1967 | Carl et al. | 65—60 |

DONALL H. SYLVESTER, *Primary Examiner.*

F. W. MIGA, *Assistant Examiner.*

U.S. Cl. X.R.

65—23, 24, 26, 60, 61, 64, 92, 94; 117—16, 17, 93, 124